United States Patent Office 3,029,265
Patented Apr. 10, 1962

3,029,265
POLYHYDROXY AMINO ETHERS AND ACYLATION PRODUCTS THEREOF
John D. Zech, Wilmington, Del., assignor to Atlas Chemical Industries, Inc., Wilmington, Del., a corporation of Delaware
No Drawing. Filed Apr. 23, 1957, Ser. No. 654,442
16 Claims. (Cl. 260—404.5)

This invention relates to processes for the synthesis of nitrogen compounds derived from polyhydric alcohols having at least three hydroxyl groups per molecule and to products which may be produced by such processes. Particularly, it relates to acylation products of such nitrogen compounds which are surface-active agents.

An object of this invention is to provide a new class of polyhydroxy primary and secondary amino ethers which are useful intermediates for the chemical synthesis of amides, esters, ester amides, substituted polyhydroxy amino ethers, and quaternary ammonium compounds.

An additional object of this invention is to provide a new class of surfactants which are acylation products of fatty acids and polyhydroxy amino ethers.

A further object of this invention is to provide a class of surfactants which form stable emulsions over a wide temperature range.

It is also an object of this invention to provide a class of compounds which, when used as additives in jet fuels, impart anti-static properties thereto.

The above objects of this invention, as well as additional objects, will be apparent to those skilled in the art from a consideration of the following description.

Briefly summarized, methods of the present invention involve the following steps:

(1) A polyhydric alcohol containing three or more hydroxyl groups per molecule, preferably a hexitol, is condensed with epichlorohydrin or a compound similar to epichlorohydrin.

(2) The condensation product is in turn reacted with ammonia or an amine of the type described below.

(3) The product of step 2, which is in the form of a hydrohalide, is neutralized with an alkali to liberate a polyhydric amino ether.

(4) From these ethers, which are chemical intermediates, amides and ester amides as well as other reaction products can be derived. Surface-active agents can be synthesized by reacting the ethers with an aliphatic monocarboxylic acid, in the manner described below.

The initial step of the synthesis is the condensation of a polyhydric alcohol having three or more hydroxyl groups per molecule with epichlorohydrin or its equivalent in the presence of a catalyst. The reaction can be exemplified by the following chemical equation:

(1)
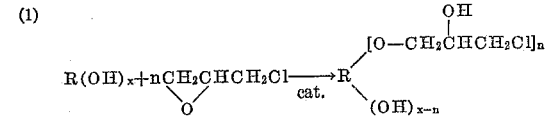

In the above equation $x$ is a number of three or more and $n$ is a number from one to $x$. R is an hydroxyl-free radical of a polyhydric alcohol. When the polyhydric alcohol is a hexitol, from one to about three mols of epichlorohydrin are usually preferred.

The reaction illustrated above may be performed in the presence of an acidic catalyst as is well known in the prior art. Preferred catalysts are those of the Lewis acid type which include, for example, $BF_3$, $BF_3$ etherate, $AlCl_3$, $SnCl_4$, but $H_2SO_4$, p-toluene sulfonic acid and the like may also be used.

The reaction may be carried out at any temperature from about 75° to 175° C., the preferred range being from 90 to 130° C. A temperature of 90° usually insures a reasonable reaction speed. Above about 130°, decomposition and dehydration of hexitols often tends to occur.

While the reaction is generally carried out in the absence of solvent or diluent, such materials may be used if desired to lower the viscosity, as an aid in controlling temperature, or to permit the use of lower temperatures where high melting polyhydric alcohols (such as hexitols) are used.

Suitable polyhydric alcohols or mixtures thereof for use in this connection include, among others, triols (such as glycerol), tetritols (such as erythritol), pentitols (such as xylitol, arabitol, etc.), the hexitols (such as sorbitol, mannitol, dulcitol, etc.), polyhydric alcohols containing more than six hydroxy groups and polyhydric alcohols such as for example pentaerythritol, trimethylolethane, and trimethylolpropane which are polymethylol alkanes.

Suitable polyhydric alcohols also include anhydro derivatives of other polyhydric alcohols (having at least three hydroxy groups per molecule) in which water has been removed from two hydroxyl groups to form a cyclic ether, such as 1,4 sorbitan, and also external ethers of polyhydric alcohols, as, for example diglycerol.

Another group of suitable polyhydroxy alcohols comprises the monosaccharides such as sorbose, mannose, glucose, arabinose and xylose as well as methyl glucoside and similar compounds.

The polyhydric alcohols useful in this invention include those, of the type listed above, which have been modified by etherification with alkylene oxides such as ethylene oxide, 1,2 propylene oxide and mixtures thereof. As is well known in the art, such a reaction yields products containing polyoxyalkylene chains of varying length. If a mixture of alkylene oxides is employed, a given polyoxyalkylene chain may contain both the oxyethylene group and the oxypropylene groups. For the purpose of utilization in this invention the most suitable polyoxyalkylene ethers of polyhydric alcohols are those formed by reacting from one to six mols of alkylene oxide with each mol of polyhydric alcohol. The term polyhydric alcohol when used hereafter is intended to include all of the above exemplified compounds and mixtures thereof.

In lieu of epichlorohydrin other reactive epihalohydrins may be used such as epibromohydrin and epiiodohydrin. Other compounds such as 1-chloro-2,3 epoxybutane and 2-chloro-3,4 epoxybutane are also suitable for the condensation.

The reaction products are for the most part very viscous syrups. They are complex mixtures which may contain residual free polyhydric alcohol in addition to various isomeric epichlorohydrin-polyhydric alcohol condensates (also referred to as chlorhydroxypropyl ethers).

The following are a few specific examples of the initial reaction which are intended to illustrate the process but not to limit it to the specific reactants involved.

EXAMPLE I-1

613 grams of anhydrous sorbitol were heated to a reaction temperature of between 97 and 107° C.; 1.5 cc. of $BF_3$ (45% $BF_3$) etherate catalyst were then added.

Thereafter, 389 grams (molal ratio 1:1.25) of epichlorohydrin were added dropwise, over a period of 34 minutes with vigorous stirring and control of cooling, so as to maintain the temperature within a specified limit. The temperature was maintained for one hour between 97 and 107° C. by the addition of heat to insure completion of the reaction.

Additional examples are given in Table I. In each case, the procedure followed was similar to the procedure outlined above. However, the molal ratio of polyhydric alcohol to epichlorohydrin was varied, as was the epichlorohydrin addition time, the reaction temperature and the amount of catalysts used.

Table I

| Example No. | Alcohol used | Grams alcohol | Grams epichlorohydrin | Molal ratio alcohol: epi. | Cc. of 45% BF₃ etherate | Reaction temp. °C. | Epichloro-hydrin addn. time | Total reaction time |
|---|---|---|---|---|---|---|---|---|
| I-1 | Sorbitol | 613 | 389 | 1:1.25 | 1.5 | 57–107 | 34 min | 1 hr. 34 min. |
| I-2 | ___do___ | 1,200 | 1,220 | 1:2 | 3.0 | 102–108 | 80 min | 2 hrs. 20 min. |
| I-3 | ___do___ | 729 | 925 | 1:2.5 | 2.0 | 98–108 | 70 min | 2 hrs. 10 min. |
| I-4 | Erythritol | 122 | 92.5 | 1:1 | 0.5 | 116–120 | 20 min | 1 hr. 20 min. |
| I-5 | Sorbitol | 1,459 | 925 | 1:1.25 | 3.0 | 110–112 | 2 hrs | 3 hrs. |
| I-6 | ___do___ | 651 | 578 | 1:1.75 | 1.5 | 98–109 | 45 min | 1 hr. 45 min. |
| I-7 | ___do___ | 1,184 | 602 | 1:1 | 3.0 | 97–109 | 38 min | 1 hr. 38 min. |
| I-8 | ___do___ | 1,200 | 1,220 | 1:2 | 3.0 | 97–104 | 67 min | 2 hrs. 7 min. |
| I-9 | ___do___ | 712 | 361 | 1:1 | 1.5 | 89–105 | 60 min | 2 hrs. 0 min. |
| I-10 | ___do___ | 600 | 610 | 1:2 | 1.5 | 93–105 | ___do___ | Do. |
| I-11 | ___do___ | 1,200 | 1,220 | 1:2 | 3.0 | 100–107 | 2 hrs. 40 min | 3 hrs. 40 min. |
| I-12 | ___do___ | 913 | 1,040 | 1:2.25 | 2.0 | 100–107 | 60 min | 2 hrs. 0 min. |
| I-13 | ___do___ | 913 | 578 | 1:1.25 | 2.0 | 101–109 | 30 min | 1 hr. 30 min. |
| I-14 | ___do___ | 2,123 | 1,345 | 1:1.25 | 5.0 | 98–108 | 60 min | 2 hrs. 0 min. |
| I-15 | ___do___ | 1,184 | 3,160 | 1:5.25 | ¹ 3.4 | 106–115 | 4 hrs. 30 min | 5 hrs. 30 min. |
| I-16 | Glycerol | 460 | 463 | 1:1 | 1.0 | 80–105 | 40 min | 1 hr. 40 min. |
| I-17 | ___do___ | 460 | 698 | 1:1.5 | 1.25 | 92–107 | 53 min | 1 hr. 53 min. |
| I-18 | Di-glycerol | 166.5 | 92.5 | 1:1 | 1.0 | 91–123 | 37 min | 1 hr. 37 min. |
| I-19² | Trimethylol-ethane | 170 | 131 | 1:1 | 2.0 | 85–111 | 31 min | 1 hr. 31 min. |

¹ Grams.
² Prepared in 250 cc. dioxane. After reaction was complete, 14 g. trimethylolethane crystallized out and were filtered off.

Considering now the production of surface-active compositions which give stable emulsions over a wide range of temperatures, their synthesis involves the reaction of the condensation product of the initial step with ammonia, a reactive primary amine or a polyamine. The reaction with ammonia or a reactive primary amine may be illustrated by the equation set forth below.

(2)
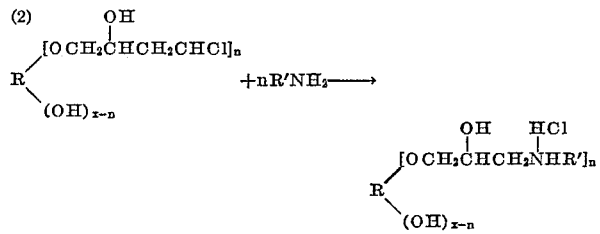

The reaction product, which is in the form of a hydrochloride, is neutralized in the next step with an alkali to liberate a polyhydric primary or secondary amino ether. This reaction may be illustrated as follows:

(3)
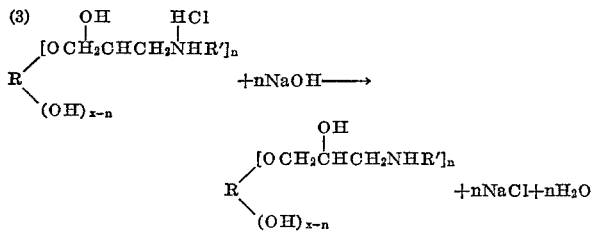

The symbols in the equations above have the same meaning as Equation 1. In addition, each R' is independently selected from the group consisting of hydrogen, alkyl, hydroxy alkyl, cyclo alkyl, and polyhydroxy alkyl.

The reaction takes place between ammonia or a reactive primary aliphatic amine (primary amines having the amino group attached to tertiary carbon atoms, because of steric hindrance effects, will not react with the products of step 1 to give products which are suitable for the subsequent reaction and the term reactive amine, when used henceforth, is intended to exclude such amines) and the product of the first step synthesis. It is carried out in the presence of an excess of ammonia or reactive primary amine. The presence of the excess reactant serves to suppress polycondensation.

Preferred reaction temperatures range from 20 to about 120° C., with an optimum range from about 30° C. to about 100° C. This reaction is exothermic and it may be carried out in an inert solvent, such as water or a lower alcohol. It is also possible to use an excess of the primary amine as a solvent where the primary amine being used in a liquid. In the case of ammonia or a volatile primary amine, such as methyl or ethyl amine, it is desirable to carry out the reaction under pressure so as to avoid the loss of the volatile reactant and thereby maintain it in excess of the theoretical molecular requirements.

By carrying out the reaction under super atmospheric pressure, higher temperatures can be used and the reaction time correspondingly reduced.

Suitable primary mono-amines for use in this connection are exemplified by methyl amine, ethyl amine, n-propyl-amine, isopropyl amine, n-butyl amine, sec. butyl amine, isobutyl amine, n-amyl amine, n-hexyl amine, cyclo-hexyl amine, ethanol amine, propanol amine, and 1-amino-2, 3 dihydroxy propane (glycerol amine) or mixtures thereof.

Mixtures of primary amines, such as hexadecyl, octadecyl, octadecenyl, and octadecadienyl may also be used. Such products are sold by Armour and Company under the generic trade name "Armeen." These products are more fully described on page 62 of the 1953 edition of "Handbook of Material Trade Names" by Zimmerman and Levine.

It is desirable, in many cases, to use the lower primary amines, which are sufficiently low-boiling, so that they can be readily separated by distillation from the reaction products which are non-volatile.

Suitable amines also include polyamines which contain not more than 3 amino nitrogen atoms. Such amines are exemplified by the ethylene polyamines and the propylene polyamines and include ethylene diamine, diethylene triamine, propylene diamine, dipropylene triamine, triethylene triamine (N-aminoethyl piperazine), hydroxyethyl diethylene triamine (and other reaction products of lower alkylene oxides such as ethylene oxide, propylene oxide or mixtures thereof with polyamines, provided however, that the resulting oxyalkylated amine contains at least two amino hydrogens), 3, 3' iminobis propylamine and mixtures of the above.

The neutralized reaction product of the polyamine derivative which corresponds to the monoamine product of Equation 3 may be represented by the following formula wherein all symbols have their previous meaning:

(3-A)
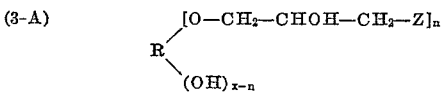

and wherein each Z is independently selected from the group of monovalent radicals consisting of:

(a)         —NE—C$_y$H$_{2y}$—NE$_2$ (b)    —NE—C$_y$H$_{2y}$—NE—C$_y$H$_{2y}$—NE$_2$

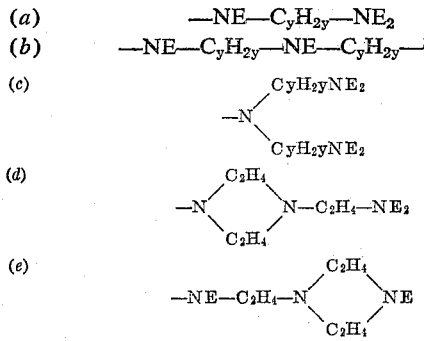

wherein further, in each radical, $y$ is either 2 or 3; and each E is independently selected from the group consisting of hydrogen and hydroxy lower alkyl, provided however that at least one E is hydrogen.

The reaction with ammonia or primary amine produces a hydrochloride of an amino ether. The amino ether is liberated by the addition of an amount of alkali equivalent to the chlorine content of the epichlorohydrin condensate used. The excess ammonia or primary amine, as the case may be, is then stripped off and can be recycled to the next batch.

The alkali used must be strong enough to liberate the amino ether from the amino hydrochloride and suitable alkalis are exemplified by the hydroxides of the alkali metals.

The amino ethers can be separated from the by-product alkali metal chloride by known methods, such as dilution with a non-solvent for the chloride followed by filtration and ion exchange. In some cases, the presence of the chloride is not objectionable and the product can be used without separating it.

The following are a few specific examples of the formation of polyhydroxy amino ethers and are to be considered illustrative only. It is to be noted that every nitrogen compound used meets the fundamental requirement of containing at least two hydrogen atoms bonded to basic nitrogen.

EXAMPLE II-1

To a flask containing 2,645 grams of a condensate prepared by a procedure similar to that of Example I-5, which contained 10 moles of combined epichlorohydrin, was added 2,430 grams of 28% aqueous ammonia (40 moles, 300% excess). The addition of the ammonia took place at temperatures from 15 to 26° C. and extended over a half hour. The solution was charged to an autoclave, the flask was rinsed with 110 grams of water, and the rinse water was also added to the autoclave. The temperature of the autoclave's contents was raised to 120° C. during a ½ hour period, and thereafter held at 120° C. for 1.5 hours while the pressure developed was 80–85 p.s.i.g.

The autoclave's contents were discharged, the autoclave rinsed with 700 g. of water and the combined solution was heated to 100° C. to boil off much of the excess NH$_3$. Thereafter, 840 g. of 50% NaOH solution (5% excess) were added and the reaction mixture was heated to 110° C. to distill off additional ammonia and water. The resulting syrup amounted to 4,230 grams and contained 10 moles of combined epichlorohydrin residues. The amino-ether syrup which was thus prepared contained approximately 0.7 equiv. of nitrogen per equiv. of epichlorohydrin.

EXAMPLE II-2

308 grams of the condensation product of Example I-1 were combined with 1160 cc. of a 40% solution of methyl amine at room temperature and the mixture was allowed to stand over night. The temperature gradually rose for several hours to about 35 to 40° C. and then gradually decreased. After standing over night, the reaction mixture was heated on a steam bath for several hours to insure completion of the reaction. Since methyl amine is a relatively volatile amine, some of the excess boiled off during this heating.

The reaction mixture was then treated with an amount of aqueous NaOH equivalent to the chlorine content of the epichlorohydrin condensate used. The excess amine and solvent were stripped off, using vacuum at the end of the stripping operation. Thereupon, the product was taken up in sufficient methanol to obtain a suitable filtering viscosity and the crystalline NaCl was filtered off. The methanol was then stripped off, leaving the polyhydroxy amino ether as a residue which still contained some sodium chloride.

The reaction yielded 325 grams of polyhydric amino ether which contained 4.86% nitrogen by weight. Additional Examples II-3 to II-23 follow in Table II.

Table II

| Example No. | Condensate of Example No. | Grams condensate | Amine used | Amount of amine | Product yield, g. | Percent N |
|---|---|---|---|---|---|---|
| II-3 | I-1 | 467 | Butyl amine | 1,100 cc | 539.5 | 4.33 |
| II-4 | I-2 | 734 | Ethanolamine | 2,000 cc | 863 | 6.31 |
| II-5 | I-4 | 214.5 | 40% methyl amine | 1,000 cc | 213.5 | 5.81 |
| II-6 | I-5 | 2,387 | NH$_4$OH (28% NH$_3$) | 2,480 g | 2,780 | 3.58 |
| II-7 | I-2 | 800 | 40% methyl amine | 3,210 cc | 782 | 6.57 |
| II-8 | I-3 | 167 | Glyceryl amine | 182 g | 249 | 6.12 |
| II-9 | I-3 | 500 | 40% methyl amine | 1,930 cc | 488 | 7.07 |
| II-10 | I-6 | 413 | Butyl amine | 1,200 cc | 476.5 | 5.04 |
| II-11 | I-7 | 325 | Cyclohexyl amine | 548 g | 403 | 3.74 |
| II-12 | I-7 | 201 | "Armeen SD"[1] | 199 g | 391 | 2.54 |
| II-13 | I-8 | 593 | Conc. NH$_4$OH (28% NH$_3$) | 3,000 cc | 536.5 | 5.27 |
| II-14 | I-9 | 450 | ___do___ | 1,650 cc | 437 | 3.59 |
| II-15 | I-15 | 1,525 | ___do___ | 2,920 g | 1,948 | |
| II-16 | I-15 | 699 | ___do___ | 3,335 g | 897 | |
| II-17 | I-16 | 369 | Ethanolamine | 1,000 cc | 425.5 | 6.46 |
| II-18 | I-17 | 461 | ___do___ | 1,500 cc | 552 | 7.56 |
| II-19 | I-18 | 259 | 40% methyl amine | 1,000 cc | 260.5 | 4.92 |
| II-20 | I-19 | 287 | Ethanolamine | 1,000 cc | 345 | 5.9 |
| II-21 | I-7 | 332 | Ethylene diamine | 700 cc | 373 | 8.71 |
| II-22 | I-7 | 275 | Diethylene triamine | 900 cc | 365 | 12.45 |
| II-23 | I-7 | 275 | Hydroxy ethyl ethylene diamine | 105 g | 357 | 7.8 |

[1] A soft fatty amine sold by Armour & Co. under this designation.

The polyhydroxy amino ethers are useful chemical intermediates. From these ethers—amides, ester amides, substituted polyhydroxy amino ethers, and quaternary ammonium compounds can be readily and easily prepared.

Formation of the emulsifier is completed by amidation of the polyhydroxy amino ether with an aliphatic mono-carboxylic acid. Despite the selection of reaction conditions which favor the formation of amides, some esterification results. Since the amino ether contains free hydroxyl groups in the portion of the molecule derived from alcohol, and since further, it may contain additional free hydroxy groups if the primary amine used in the second step was an alkanol amine (such as, for instance, ethanol amine or propanol amine), there is always ester formation. Thus, the final reaction product is a combined amide and ester. The relative extent of amidation and esterification may be varied by varying the amount of fatty acid reacted with the polyhydroxy amino ether.

Amidation of the polyhydroxy amino ethers may be either total or partial. If only one amino nitrogen atom capable of amidation is present in the ether molecule, such as would be the case when the ether is formed by the seriatim reaction of one molecule of polyol, one molecule of epichlorohydrin and one molecule of a reactive primary monoamine, then the surface-active compositions of this invention are total amidation products. However, when more than one molecule of epichlorohydrin attaches to a given polyol molecule and/or when a polyamine is used to form the amino ether then a molecule of the ether may contain a plurality of amino nitrogen atoms which are capable of amidation. In the case of such poly-amino ethers it is essential that at least one amino nitrogen be amidated. How many more will be amidated is a function of the carboxyl:amino nitrogen ratio of reactants. While some esterification always occurs, lower ratios favor products which are predominantly amides whereas ratios above 1:1 tend to favor increased ester formation. Generally any ratio of carboxyl:total nitrogen from 0.75 to 6 may be used, those compounds prepared using ratios of from 3 to 6 having higher ester content. However, the range from 0.75 to 2.0 is generally preferred.

Total amidation of an ether derived from a primary mono-amine can be illustrated by the following equation:

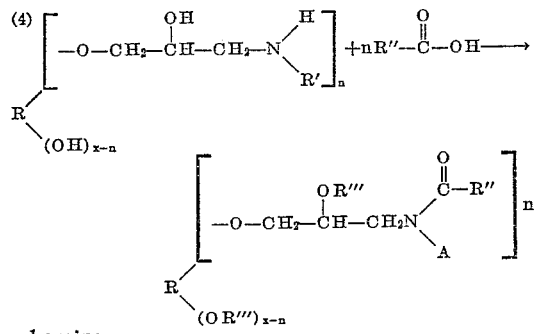

wherein:

$x$ is a number of at least 3 and $n$ is a number from 1 to $x$.

R″—C— is the acyl radical of an aliphatic monocarboxylic acid.

R is an hydroxyl-free radical of a polyhydric alcohol.

R′ is hydrogen, alkyl, cyclo alkyl, hydroxy alkyl or polyhydroxy alkyl.

Each R‴ is independently selected from the group consisting of hydrogen atoms and acyl radicals of aliphatic monocarboxylic acid.

Each A is independently selected from the group consisting of hydrogen, alkyl, cyclo alkyl, hydroxy alkyl, polyhydroxy alkyl, acylated hydroxy alkyl, and acylated polyhydroxy alkyl.

In the case of the polyamines which have previously been described, the corresponding amidation products may be represented as having the formula:

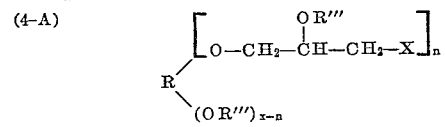

wherein common symbols have the same meaning as in Equation 4 above and wherein each X is independently selected from the group of monovalent radicals consisting of:

(a) $NY\text{—}C_yH_{2y}\text{—}NY_2$ (b) $NY\text{—}C_yH_{2y}\text{—}NY\text{—}C_yH_{2y}\text{—}NY_2$ (c) 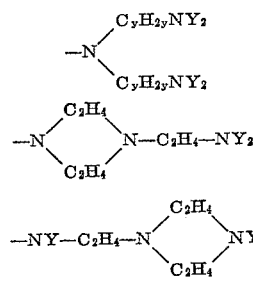

(d)

(e) 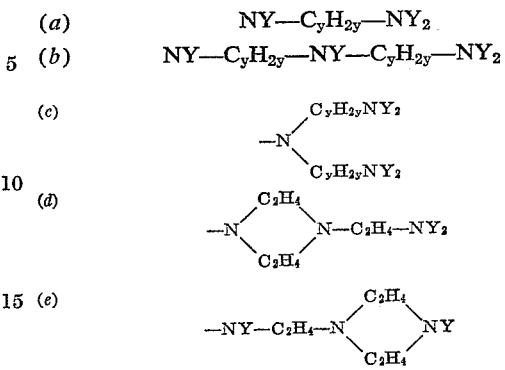

wherein, further, $y$ is an integer from 2 to 3, and each Y is independently selected from the group consisting of hydrogen, acyl radicals of aliphatic monocarboxylic acids, hydroxy lower alkyl and acylated hydroxy lower alkyl, provided however that at least one Y is the acyl radical of an aliphatic monocarboxylic acid.

The amidation reaction, in which at least one mol of $H_2O$ is evolved per mol of acid reacted, is carried out at an elevated temperature, within the range of about 170 and about 220° C.

If none, or only part of the salt, was removed prior to this reaction, it can be filtered off from the amide either with or without dilution with a non-solvent for the salt. For some applications, the salt may be allowed to remain in the final product.

As has been stated, it is also possible to only partially amidate an amino ether which has been made from a polyolepihalohydrin derivative wherein the ratio of epihalohydrin to polyol was greater than 1:1. Thus, the amidation products formed by reacting a monocarboxylic acid with the ether made from a polyol-epihalohydrin derivative and ammonia or a reactive primary mono-amine may be generally represented by the following formula:

(5) 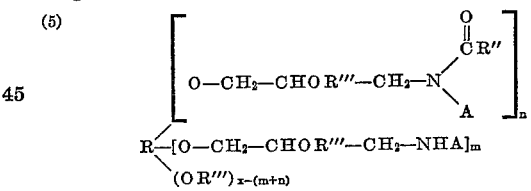

wherein $x$ is a number of at least 3; $n$ is a number from 1 to $x$;

And $m$ is a number from zero to the quantity $x-n$; and wherein further, $$R''\overset{O}{\underset{\|}{C}}\text{—}$$

is the acyl radical of an aliphatic monocarboxylic acid;
R is an hydroxyl-free radical of a polyhydric alcohol;
Each A is independently selected from the group consisting of hydrogen, alkyl, cyclo alkyl, hydroxy lower alkyl, polyhydroxy lower alkyl, acylated hydroxy lower alkyl and acylated polyhydroxy lower alkyl; and
Each R‴ is independently selected from the group consisting of hydrogen atoms and acyl radicals of aliphatic monocarboxylic acids.

The corresponding generalized formula for products formed from polyamine derivatives is as follows:

(5-A) 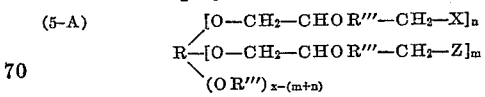

wherein Z has the meaning assigned in Formula 3-A, X has the meaning assigned in Formula 4-A and $x$, $m$, $n$,, R and R‴ have the same meaning as in Formula 5.

In the case where total amidation does not occur and consequently only part of the amino groups are reacted, the resulting amides will contain free amino groups and can, therefore, be used as cationic surfactants, whereas the fully amidated products are non-ionic surfactants.

Suitable mono-carboxylic acids for the amidation include the higher fatty acids such as lauric, myristic, palmitic, stearic, oleic, linoleic, linolenic, ricinoleic, 12-hydroxy stearic acid, erucic, as well as mixed acids such as the fatty acids derived from animal and vegetable fats and oils, tall oil, naphthenic acids and acids obtained by the oxidation of petroleum fractions. While fatty acids having 12 to 18 carbon atoms are preferred for this reaction, it is also possible to use a short chain acid such as acetic acid, provided that the amino ether which is being amidated has a long alkyl chain which was derived from a fatty amine in the previous synthesis step.

As is well known in the art, emulsions have both a hydrophobe and a hydrophile function. In the present compounds, the hydrophobe function can be contributed by either the carbon chains derived from the amine or those derived from fatty acid, or both. Thus, when a short chain acid as, for example, acetic is employed, a long chain amine should be used. In general, it is preferred that the combined carbon chain lengths of amine and fatty acid groups used in the preparation of the surfactants of this invention total over 12.

The following are examples of the amidation reaction:

EXAMPLE III-1

A portion of the amino-ether prepared in Example II-1 was stripped to 183° C. To this ether (which contained 1.44 equivalents of combined epichlorohydrin residues) was added 856 grams (2.95 moles) of oleic acid derived from tall oil (sold as the trademarked product Acintol FA-2). The reactant molal ratio of fatty acid to nitrogen was approximately 2.9:1. The reaction was allowed to proceed for 4 hours at 200° C., after which time the Acid Number of the amide product was 11.6; and thereafter was allowed to proceed for an additional hour at 230° C., at which time the Acid Number of the final amide product was 6.7.

EXAMPLE III-2

Another portion of the amino-ether prepared in Example II-1 was stripped to 180° C. To this ether (which contained 1.046 equivalents of combined epichlorohydrin residues) was added 925 grams (3.19 moles) of oleic acid derived from tall oil. The reactant molal ratio of fatty acid to nitrogen was approximately 4.4:1. The reaction was allowed to proceed for 4 hours at 200° C., after which time the Acid Number of the amide product was 29; and thereafter for an additional hour at 230° C., at which time the Acid Number of the amide product was 17. To this product were added .346 equivalent of NaOH and the reaction continued for another hour at 230° C. The final product, which was calculated to contain 10.8% soap, had an Acid Number of 11.

EXAMPLE III-3

An additional portion of the amino-ether prepared in Example II-1 was stripped to 180° C. To this ether (which contained .848 equivalent of combined epichlorohydrin residues) was added 995 grams (3.43 moles) of oleic acid derived from tall oil. The reactant molal ratio of fatty acid to nitrogen was approximately 5.8:1. The reaction was allowed to proceed for 4 hours at 200° C., after which time the Acid Number of the amide product was 48.5; and thereafter for an additional hour at 230° C., at which time the Acid Number of the amide product was 32.5. To this product were added .68 equivalent of NaOH and the reaction continued for another hour at 230° C. The final product, which was calculated to contain 19.1% soap, had an Acid Number of 18.

EXAMPLE III-4

310 grams of oleic acid were added to 286 grams of the product of Example II-1 (molal ratio carboxyl:N, 1.1:1). The mixing took place at between 70 and 100° C. Thereafter, the reactants were heated to the reaction temperature of between 165 and 200° C. and held there for a period of three hours and 20 minutes.

Initial viscosity was high due to the formation of amine soaps. However, as the temperature was raised and the amidation proceeded, the viscosity decreased.

The resultant product has an acid number of 10.5, a saponification number of 51 and an OH number of 40.

Additional Examples III-5 to III-33 are presented in Table III. In each instance, the reaction procedures were similar to those in Example III-4 which was described above in narrative form.

Table III

| Example No. | Acid used | Grams acid | Amine ether synthesized in Example No. | Grams ether | Mol ratio carboxyl:N | Reaction time | Reaction temp.,° C. | Product acid number | Characteristics Sap. number | OH number |
|---|---|---|---|---|---|---|---|---|---|---|
| III-5 | Oleic | 218 | II-3 | 250 | 1:1 | 3 hrs. 50 min | 178-205 | 6.4 | 41 | 441 |
| III-6 | Tallow-F.A. | 212 | II-3 | 243 | 1:1 | do | 175-211 | 5.5 | 44 | 375 |
| III-7 | Oleic | 220 | II-5 | 189 | 1:1 | 3 hrs. 20 min | 179-210 | 3.2 | 41 | 429 |
| III-8 | Tall oil | 2,175 | II-6 | 2,780 | 1:1 | 2 hrs. 0 min | 185-200 | 5.4 | 24 | 550 |
| III-9 | Oleic | 274 | II-8 | 223 | 1:1 | 2 hrs. 30 min | 185-219 | 3.7 | 85 | 358 |
| III-10 | do | 292 | II-9 | 205 | 1:1 | 2 hrs. 15 min | 187-204 | 8.8 | 47 | 267 |
| III-11 | Lauric | 252 | II-9 | 249 | 1:1 | 2 hrs. 30 min | 180-210 | 12.1 | 56 | 324 |
| III-12 | Oleic | 268 | II-7 | 202 | 1:1 | 3 hrs. 0 min | 181-210 | 6.3 | 46 | 313 |
| III-13 | Lauric | 192 | II-7 | 204 | 1:1 | 2 hrs. 50 min | 180-219 | 8.1 | 53 | 395 |
| III-14 | Oleic | 254 | II-4 | 201 | 1:1 | 2 hrs. 15 min | 180-215 | 8.3 | 93 | 275 |
| III-15 | Ricinoleic | 280 | II-4 | 201 | 1:1 | 2 hrs. 20 min | 180-208 | 6.9 | 69 | 358 |
| III-16 | Tall oil | 242 | II-4 | 154 | 0.75:1 | 2 hrs. 15 min | 187-218 | 22.3 | 51 | 277 |
| III-17 | Oleic | 344 | II-7 | 347 | 1:1 | do | 183-206 | 4.4 | 21 | 426 |
| III-18 | Lauric | 145 | II-5 | 202 | 1:1 | do | 180-216 | 4.0 | 45 | 381 |
| III-19 | Oleic | 250 | II-13 | 243 | 1:1 | 2 hrs. 0 min | 181-218 | 5.3 | 25 | 433 |
| III-20 | do | 175 | II-14 | 244 | 0.97:1 | 2 hrs. 30 min | 188-212 | 5.8 | 25 | 655 |
| III-21 | Lauric | 195 | II-11 | 367 | 1:1 | 2 hrs. 20 min | 187-213 | 8.4 | 75 | 546 |
| III-22 | Stearic | 250 | II-10 | 246 | 1:1 | 2 hrs. 10 min | 187-213 | 3.5 | 38 | 333 |
| III-23 | Acetic | 27 | II-12 | 247 | 1:1 | 2 hrs. 45 min | 172-213 | 2.6 | 40 | 468 |
| III-24 | Tall oil | 278 | II-16 | 208 | | 2 hrs. 30 min | 180-200 | 2.9 | (¹) | |
| III-25 | Oleic | 231 | II-19 | 233 | 1:1 | 2 hrs. 40 min | 183-226 | 6.1 | 49 | 367 |
| III-26 | do | 260 | II-17 | 200 | 1:1 | do | 180-212 | 2.2 | 99 | 294 |
| III-27 | do | 266 | II-18 | 252 | 1:1 | 1 hr. 40 min | 180-199 | 3.1 | 99 | 235 |
| III-28 | do | 200 | II-20 | 169 | 1:1 | 2 hrs. 30 min | 187-212 | 5.2 | 97 | 230 |
| III-29 | do | 234 | II-21 | 179 | 0.75:1 | 2 hrs. 15 min | 176-208 | 6.2 | 23 | 486 |
| III-30 | do | 310 | II-22 | 165 | 0.75:1 | 3 hrs. 50 min | 180-188 | 3.5 | 27 | 335 |
| III-31 | do | 215 | II-23 | 152 | 0.9:1 | 2 hrs. 0 min | 177-213 | 4.5 | 63 | 367 |
| III-32 | do | 370 | II-22 | 165 | 0.9:1 | 2 hrs. 50 min | 175-211 | 3.0 | 37 | 253 |
| III-33 | do | 253 | II-21 | 160 | 0.9:1 | 2 hrs. 15 min | 175-210 | 7.9 | 30 | 399 |

¹ 2.65% N.

One use of the amides synthesized in the manner described is as the emulsifier in a water-in-oil emulsion drilling fluid. Typical drilling fluids employing the amide as the emulsifier also include a water phase (preferably containing salt), and an oil phase.

A water-in-oil emulsion drilling fluid was prepared using the product of Example III–4. The drilling fluid had the following formulation:

| | Grams |
|---|---|
| Saturated salt water | 252 |
| Fuel oil | 117 |
| 325 mesh Bentonite | 20 |
| Water-soluble emulsifier | 3 |
| Product of Example III–4 | 5 |
| Total | 397 |

The above formulation is representative of many which can be prepared. All of them exhibit remarkable stability even under high temperature conditions.

Some of the products of the present invention are useful as corrosion inhibitors, particularly for brine solutions containing hydrogen sulfide which are commonly encountered in the oil industry. For example, the product of Example III–16, when tested for corrosion inhibiting properties in accordance with the procedure described in detail in "The Development of a Standard Laboratory Procedure for Screening Corrosion Inhibitors for Use in Oil and Gas Wells" by E. C. Greco and J. C. Spalding (paper prepared for National Association of Corrosion Engineers, 1954), gives excellent corrosion protection (95.4% protection) when used at a concentration of 100 p.p.m. in a 5% brine solution containing 500 p.p.m. of hydrogen sulfide.

The products of the invention are also useful for creating water-in-oil emulsions for a number of other uses. One applicaiton relates to marine diesel engines which employ oil as a circulating lubricant. In order to maintain lubricating properties, it is desirable that any water which may get into the lubricating system be incorporated in the lubricant in the form of a temperature-stable emulsion, rather than being present as a separate phase. The following formulation is illustrative of the wide range of utility afforded by the instant emulsifiers for such applications.

If the emulsifier of Example III–6 is added to lubricating oil in the ratio of three parts by weight of emulsifier to 70 parts by weight of lubricating oil, it will then be possible to incorporate amounts of water ranging from 0 to 150 parts. Throughout the entire range a homogeneous water-in oil emulsion will exist. The emulsion can be formed whether the water is salt water, such as is commonly found in marine service, or fresh water, which might result from engine exhaust. These emulsions are stable over a wide range of temperatures.

Compositions of this invention find additional utility as anti-static additives to hydrocarbon fuels of the low vapor pressure wide cut gasoline type. Fuels of this type may usually be characterized as having a Reid vapor pressure within the range of about 2.0 to 3.0. Handling them has, in the past, presented a considerable explosion hazard because their vapor pressure at ambient temperatures is high enough that when a body of fuel is maintained in an ordinary vented tank the amount of vapor is sufficient to provide an explosive mixture but insufficient to lower the proportion of air to such a degree that the mixture above the fuel is not explosive. Consequently fuels of this sort have been susceptible to ignition by sparks such as can be generated by static electricity build up in the fuel body.

It has been found that compounds of this invention have the property of lowering the electrical resistivity of the fuels and/or inhibiting the buildup of static electricity in them. In this way the explosion hazard in handling the fuel is greatly minimized when added to such fuel in small quantities of about 0.2% and less. Preferred compositions of the invention for this purpose are those which are soluble in the fuel without haze at concentrations up to 0.2% by weight at temperatures as low as $-60°$ F. The amount of composition of the invention added for anti-static use should be sufficient to reduce the electrical resistivity of the fuel to a value below about $1 \times 10^{10}$ ohm-centimeters. Usually that amount will be between about 0.2% and 0.0025%.

A fuel which is particularly susceptible to this static electrical explosive hazard and in which the compositions of the present invention are particularly useful as anti-static additives is that used for jet engines and referred to as JP–4 fuel. It is completely described in military specification MIL–F–5624C.

In Table IV, are listed a number of examples of additive content of jet fuels containing compounds of the invention. Each of these fuels was prepared by simply adding the amount of additive listed in the table to JP–4 fuel. Each of the resulting fuels had a specific resistivity below $1 \times 10^{10}$ ohm-centimeters and was useful as a fuel in jet engines. Tests performed on each fuel indicated that it could be handled without buildup of static electricity and that no precipitate haze appeared in the fuel when it was cooled to a temperature of $-60°$ F.

*Table IV*

| Additive | Concentration (weight percent of fuel) |
|---|---|
| Product of Example— | |
| III–5 | .05 |
| III–8 | 0.1 |
| III–22 | 0.1 |
| III–9 | 0.1 |
| III–11 | 0.05 |
| III–12 | 0.05 |
| III–13 | 0.05 |
| III–29 | 0.05 |
| III–30 | 0.1 |
| III–31 | 0.1 |
| III–33 | 0.05 |

Many changes in processing details may be made without departing from the principles set forth herein and the invention is to be broadly construed in accordance with the following claims.

What is claimed is:

1. A process comprising condensing sorbitol with epichlorohydrin in the molar ratio of 1:1.25, aminating the product of the aforesaid reaction with ammonia at a temperature of about 20° to about 120° C. in the presence of an excess of ammonia, liberating the ether condensation product with an alkali, and thereafter amidating and esterifying the resulting polyhydroxy amino ether by contacting it with oleic acid at a temperature within the range of about 170° to about 220° C.

2. A process comprising the steps of (1) aminating the condensation product of a polyhydric alcohol, having from 3 to 6 hydroxy groups per molecule, and an epihalohydrin, with a basic nitrogen-containing compound selected from the group consisting of ammonia, reactive primary alkyl monoamine, reactive primary hydroxy lower alkyl monoamine, reactive primary cyclo alkyl monoamine, reactive primary polyhydroxy lower alkyl monomanie, and alkylene polyamines containing from 2 to 3 amino nitrogen atoms and at least 2 amino hydrogen atoms per molecule; (2) liberating polyhydroxy amino ether condensation products by neutralizing the product of step 1 with an alkali; (3) and thereafter acylating the polyhydroxy amino ether condensation products of step 2 to form a fatty acid amide.

3. A process comprising the steps of (1) aminating the condensation products of sorbitol and epichlorohydrin with a basic nitrogen-containing compound selected from the group consisting of ammonia, reactive primary alkyl monoamine, reactive primary hydroxy lower alkyl monoamine, reactive primary cyclo alkyl monoamine, reactive primary polyhydroxy lower alkyl monoamine, and lower alkylene polyamines containing from 2 to 3 amino nitrogen atoms and at least 2 amino hydrogen atoms per molecule; (2) liberating polyhydroxy amino ether condensation products by neutralizing the product of step 1 with an alkali; (3) and thereafter acylating the polyhydroxy amino ether condensation products of step 2 to form a fatty acid amide.

4. The reaction product made by the process of claim 2.

5. The process of claim 4 wherein the acylation is carried out by contacting the polyhydroxy amino ether condensation products with a higher fatty acid which contains from 12 to 18 carbon atoms per molecule.

6. The process of claim 5 wherein said nitrogen-containing compound is ammonia.

7. The process of claim 5 wherein said nitrogen-containing compound is methylamine.

8. The process of claim 5 wherein said nitrogen-containing compound is ethylene diamine.

9. The process of claim 5 wherein said nitrogen-containing compound is diethylene triamine.

10. The reaction product made by the process of claim 3.

11. The reaction product made by the process of claim 5.

12. The reaction product made by the process of claim 6.

13. The reaction product made by the process of claim 7.

14. The reaction product made by the process of claim 8.

15. The reaction product made by the process of claim 9.

16. The reaction product made by the process of claim 1.

References Cited in the file of this patent

UNITED STATES PATENTS

| | | |
|---|---|---|
| 2,069,336 | Schmidt et al. | Feb. 2, 1937 |
| 2,525,771 | Cook et al. | Oct. 17, 1950 |
| 2,538,072 | Zech | Jan. 16, 1951 |
| 2,581,464 | Zech | Jan. 8, 1952 |
| 2,589,199 | Monson | Mar. 11, 1952 |
| 2,598,213 | Blair | May 27, 1952 |
| 2,609,370 | Gaver et al. | Sept. 2, 1952 |
| 2,775,604 | Zech | Dec. 25, 1956 |

UNITED STATES PATENT OFFICE
CERTIFICATE OF CORRECTION

Patent No. 3,029,265                          April 10, 1962

John D. Zech

It is hereby certified that error appears in the above numbered patent requiring correction and that the said Letters Patent should read as corrected below.

Columns 9 and 10, Table III, under the heading "Reaction time", Example No. III-30, for "3 hrs. 50 min." read -- 3 hrs. 0 min. --; column 10, lines 9, 17 and 25, "equivalent", each occurrence, read -- equivalents --; column 12, line 63, for "monomanie" read -- monoamine --.

Signed and sealed this 11th day of December 1962.

(SEAL)
Attest:

ERNEST W. SWIDER                          DAVID L. LADD
Attesting Officer                             Commissioner of Patents